United States Patent
Wang et al.

(10) Patent No.: US 10,222,897 B2
(45) Date of Patent: Mar. 5, 2019

(54) ARRAY SUBSTRATE, DRIVING METHOD, MANUFACTURING METHOD THEREOF AND CORRESPONDING DISPLAY APPARATUS

(71) Applicants: BOE TECHNOLOGY GROUP CO., LTD., Beijing (CN); BEIJING BOE DISPLAY TECHNOLOGY CO., LTD., Beijing (CN)

(72) Inventors: Baoqiang Wang, Beijing (CN); Xibin Shao, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 314 days.

(21) Appl. No.: 15/113,228

(22) PCT Filed: Dec. 29, 2015

(86) PCT No.: PCT/CN2015/099452
§ 371 (c)(1),
(2) Date: Jul. 21, 2016

(87) PCT Pub. No.: WO2017/016170
PCT Pub. Date: Feb. 2, 2017

(65) Prior Publication Data
US 2017/0235405 A1   Aug. 17, 2017

(30) Foreign Application Priority Data
Jul. 28, 2015   (CN) .......................... 2015 1 0451467

(51) Int. Cl.
*G06F 3/041*   (2006.01)
*G06F 3/044*   (2006.01)

(52) U.S. Cl.
CPC ............ *G06F 3/0416* (2013.01); *G06F 3/044* (2013.01); *G06F 2203/04103* (2013.01)

(58) Field of Classification Search
CPC ................... G06F 3/0416; G06F 3/044; G06F 2203/04103
See application file for complete search history.

(56) References Cited

U.S. PATENT DOCUMENTS

| 2015/0145806 | A1  | 5/2015  | Chen et al. |
| 2015/0378471 | A1* | 12/2015 | Liu ........................ G06F 3/044 345/174 |
| 2016/0154515 | A1* | 6/2016  | Mu ........................ G06F 3/0412 345/174 |

FOREIGN PATENT DOCUMENTS

| CN | 104182108 A | 12/2014 |
| CN | 104699354 A | 6/2015 |

(Continued)

OTHER PUBLICATIONS

PCT (CN) Written Opinion, for co-pending International application No. PCT/CN2015/099452, dated Apr. 27, 2016, 7 pgs.: with English Translation.

(Continued)

*Primary Examiner* — Charles V Hicks
(74) *Attorney, Agent, or Firm* — Armstrong Teasdale LLP (57) ABSTRACT

An array substrate is provided. The array substrate includes a substrate, a pixel switch array, and a plurality of gate scanning lines and a plurality of data lines formed on the substrate, and having data signal input terminals and touch transmitting signal input terminals, the array substrate further comprising a display/touch conversion switch array and a conversion control signal line formed on the substrate, wherein the display/touch conversion switch array is coupled to at least a part of the data lines and to the conversion control signal line, and is adapted to, under (Continued)

control of the conversion control signal line, couple the at least a part of the data lines to the data signal input terminals in a display stage, and couple the at least a part of the data lines to the touch transmitting signal input terminals in a touch stage as touch transmitting electrodes.

19 Claims, 3 Drawing Sheets

(56) References Cited

FOREIGN PATENT DOCUMENTS

| | | |
|---|---|---|
| CN | 104991678 A | 10/2015 |
| KR | 20100080026 A | 7/2010 |

OTHER PUBLICATIONS

International Search Report and Written Opinion, dated Apr. 27, 2016, for co-pending International application No. PCT/CN2015/099452 (14 pgs.).

\* cited by examiner

ARRAY SUBSTRATE, DRIVING METHOD, MANUFACTURING METHOD THEREOF AND CORRESPONDING DISPLAY APPARATUS

CROSS REFERENCE TO RELATED APPLICATIONS

The present application is a National Stage Entry of PCT/CN2015/099452 filed Dec. 29, 2015, which claims the benefit and priority of Chinese Patent Application No. 201510451467.2, filed on Jul. 28, 2015, both of which are incorporated herein by reference in their entirety.

BACKGROUND

Exemplary embodiments of the present disclosure relate to an array substrate, a driving method, a manufacturing method thereof and a corresponding display apparatus.

An existing touch display apparatus may be divided into in cell type and on cell type, wherein in an in cell type touch display apparatus, generally, electrodes in a display panel are reused as touch transmitting electrodes for touch control. Whereby, not only overall cell gap of the display apparatus can be reduced, but also a process dedicated for manufacturing the touch transmitting electrodes can be omitted, thus the in cell type touch display apparatus gradually becomes predominant.

In an existing predominant in cell type touch display apparatus, generally, common electrodes in a display panel are reused as touch transmitting (Tx) electrodes. However, in order to improve touch response speed, touch transmitting electrode lines for providing touch transmitting signals to the touch transmitting electrodes are generally formed from metal material, and the common electrodes are generally formed from transparent material having relative poor conductivity such as ITO, thus two manufacturing processes are needed to respectively form the common electrodes and the touch transmitting electrode lines, thereby increasing manufacturing difficulty.

BRIEF DESCRIPTION

According to a first aspect, there is provided an array substrate comprising a substrate, a pixel switch array, a plurality of gate scanning lines and a plurality of data lines formed on the substrate, and having data signal input terminals and touch transmitting signal input terminals. The array substrate further includes a display/touch conversion switch array and a conversion control signal line formed on the substrate, wherein the display/touch conversion switch array is coupled to at least a part of the data lines and to the conversion control signal line, and is adapted to, under control of the conversion control signal line, couple the at least a part of the data lines to the data signal input terminals in a display stage and couple the at least a part of the data lines to the touch transmitting signal input terminals in a touch stage as touch transmitting electrodes.

According to an example embodiment, the display/touch conversion switch array includes a display switch array and a touch switch array, and the control signal line includes a display control signal line and a touch control signal line, wherein each display switch of the display switch array has a first terminal coupled to one data line in one to one correspondence, has a second terminal coupled to one data signal input terminal in one to one correspondence, and has a control terminal coupled to the display control signal line, and each touch switch of the touch switch array has a first terminal coupled to one data line in one to one correspondence, has a second terminal coupled to the touch transmitting signal input terminal, and has a control terminal coupled to the touch control signal line.

According to an example embodiment, each of the touch transmitting signal input terminals is coupled to the second terminals of the touch switches coupled to at least two adjacent data lines.

According to an example embodiment, each of the touch transmitting signal input terminals is coupled to the second terminals of the touch switches coupled to four adjacent data lines.

According to an example embodiment, the data lines are divided into a reused data line set and a non-reused data line set, the reused data line set and the non-reused data line set are arranged alternately, and the display/touch conversion switch array is coupled to the data lines in the reused data line set.

According to a second aspect, there is provided a driving method for driving the above array substrate. The driving method includes in the display stage, applying a control signal on the conversion control signal line so that the display/touch conversion switch array couples the plurality of data lines to the data signal input terminals, and in the touch stage, applying a control signal on the conversion control signal line so that the display/touch conversion switch array couples the plurality of data lines to the touch transmitting signal input terminals.

According to an example embodiment, the driving method further includes in the touch stage, applying a control signal on the gate scanning lines so that pixel switches in the pixel switch array are turned off.

According to a third aspect, there is provided a method for manufacturing an array substrate. The method includes forming a pixel switch array, gate scanning lines and data lines on a substrate, and forming data signal input terminals and touch transmitting signal input terminals, wherein the method further includes forming a display/touch conversion switch array and a conversion control signal line on the substrate, wherein the display/touch conversion switch array is coupled to a plurality of data lines of the data lines and to the conversion control signal line, and is adapted to, under the control of the conversion control signal line, couple the plurality of data lines to the data signal input terminals in a display stage and couple the plurality of data lines to the touch transmitting signal input terminals in a touch stage as touch transmitting electrodes.

According to an example embodiment, forming the display/touch conversion switch array on the substrate includes forming the display/touch conversion switch array in a same process as for forming the pixel switch array.

According to a fourth aspect, there is provided a display apparatus including the above array substrate, the display apparatus further includes a color film substrate.

According to an example embodiment, the color film substrate includes a substrate and a common electrode pattern formed on the substrate, the common electrode pattern includes a plurality of common electrode blocks and touch receiving electrode lines, the common electrode blocks located in a same row are coupled to a same touch electrode receiving line as one touch receiving electrode.

According to an example embodiment, the display/touch conversion touch array in the array substrate includes a display switch array and a touch switch array, the control signal line includes a display control signal line and a touch control signal line, the display apparatus further includes a data driving circuit, a touch driving circuit, a gate scanning circuit and a sequential control circuit; circuit, wherein the data driving circuit is coupled to a display enable signal output terminal of the sequential control circuit and to a data signal input terminal of the array substrate, and adapted to output a data voltage to the array substrate when receiving a display enable signal output by the sequential control circuit through the display enable signal output terminal, the gate scanning circuit is coupled to the display enable signal output terminal of the sequential control circuit, and adapted to turn on pixel switches in the pixel switch array row by row when receiving the display enable signal output by the sequential control circuit through the display enable signal output terminal, the touch driving circuit is coupled to a touch enable signal output terminal of the sequential control circuit and to a touch transmitting signal input terminal of the array substrate, and adapted to output a touch transmitting signal to the array substrate when receiving a touch enable signal output by the sequential control circuit through the touch enable signal output terminal, and the display control signal line is coupled to the display enable signal output terminal, the display switch is adapted to be turned on when the display enable signal is output at the display enable signal output terminal, and the touch control signal line is coupled to the touch enable signal output terminal, the touch switch is adapted to be turned on when the touch enable signal is output at the touch enable signal output terminal.

In the array substrate provided by the disclosure, data lines are reused as touch transmitting electrodes to realize touch detection, since data lines are generally extended through the entire display area along a column direction, it is not necessary to form touch transmitting electrode lines separately, whereby manufacturing difficulty is reduced. Alternatively, even touch transmitting electrode lines having certain length need to be manufactured due to limitation on the number of touch transmitting signal input terminals, since the data lines are also generally formed from metal material, the data lines can be formed in a same process as for forming the touch transmitting electrode lines, thus manufacturing difficulty can also be reduced.

BRIEF DESCRIPTION OF THE DRAWINGS

To illustrate embodiments of the disclosure more clearly, drawings need to be used in describing the embodiments or the prior art will be introduced briefly, apparently, the drawings in the following description are merely some example embodiments, and other drawings may be obtained from these drawings by a person skilled in the art without any inventive work.

DETAILED DESCRIPTION

Hereinafter, exemplary embodiments will be described clearly and completely in conjunction with drawings. Apparently, the described embodiments are just part of rather than all of the embodiments of the disclosure. Based on the described embodiments, all other embodiments obtained by those skilled in the art without any inventive work are within protection scope of the disclosure.

In description of the example embodiments, it should be noted that, orientation or positional relationship indicated by terms such as "up", "down", "top" and "bottom" are orientation or positional relationship shown based on the drawings. These terms are only for convenience of description and for simplifying description, and do not indicate or imply that the apparatus or element referred to must have particular orientation, being constructed or operated in particular orientation, thus, they should not be construed to be limitations.

In addition, terms such as "first", "second", "third", and so on are only used for purpose of description, and should not be construed as to indicate or imply relative importance. The term "a plurality of" as used herein refers to two or more, unless explicitly defined otherwise.

According to an example embodiment, there is provided an array substrate and a driving method for the array substrate, the array substrate including a substrate, a pixel switch array, gate scanning lines and data lines formed on the substrate, and having data signal input terminals and touch transmitting signal input terminals. The array substrate further includes a display/touch conversion switch array and a conversion control signal line formed on the substrate, wherein the display/touch conversion switch array is coupled to a plurality of data lines of the data lines and to the conversion control signal line, and is adapted to, under control of the conversion control signal line, couple the plurality of data lines to the data signal input terminals in a display stage and couple the plurality of data lines to the touch transmitting signal input terminals in a touch stage as touch transmitting electrodes.

According to an example embodiment, a method for driving the above array substrate may include in the display stage, applying a control signal on the conversion control signal line so that the display/touch conversion switch array couples the plurality of data lines to the data signal input terminals, and in the touch stage, applying a control signal on the conversion control signal line so that the display/touch conversion switch array couples the plurality of data lines to the touch transmitting signal input terminals.

In the array substrate and a driving method thereof provided in accordance with the example embodiment, data lines are time division reused, that is, in a display stage, the data lines are used as data lines to receive data signals, thereby realizing image display; and in a touch stage, the data lines are used as touch transmitting electrodes, thereby realizing touch detection. Since data lines are generally extended through the entire display area along a column direction, it is not necessary to form touch transmitting electrode lines separately, whereby manufacturing difficulty is reduced. Alternatively, even touch transmitting electrode lines having certain length need to be manufactured due to limitation on the number of touch transmitting signal input terminals, since the data lines are also generally formed from metal material, the data lines can be formed in a same process as for forming the touch transmitting electrode lines, thus manufacturing difficulty can also be reduced.

In some example embodiments, in order to avoid writing data signals into pixels in the touch stage, pixel switches in a pixel switch array may be turned off in the touch stage, and thus emission display in a next frame can be avoided.

According to another example embodiment, there is provided a display apparatus, the display apparatus includes a color film substrate in addition to the above array substrate.

According to the example embodiment, the color film substrate may include a substrate and a common electrode pattern formed on the substrate, the common electrode pattern includes a plurality of common electrode blocks and touch receiving electrode lines, the common electrode blocks located in a same row are coupled to a same touch electrode receiving line as one touch receiving electrode. By reusing the common electrodes in the color film substrate as touch receiving electrode lines, cell gap and manufacturing difficulty can be further reduced.

In the present application, in the touch stage, all of the data lines can be used as touch transmitting electrode lines, or a part of the data lines can be used as touch transmitting electrode lines, which can be set according to requirement on touch accuracy.

Hereinafter, structure of an array substrate provided in accordance with an example embodiment and a driving method thereof, structure of a display apparatus include the array substrate will be described in conjunction with accompany drawings.

The description will be given through an example that part of data lines are used as touch transmitting electrode lines in a touch stage, data lines used as touch transmitting electrode lines in the touch stage are referred to as reused data line set, and the remaining data lines are referred to as non-reused data line set.

Figure 1:
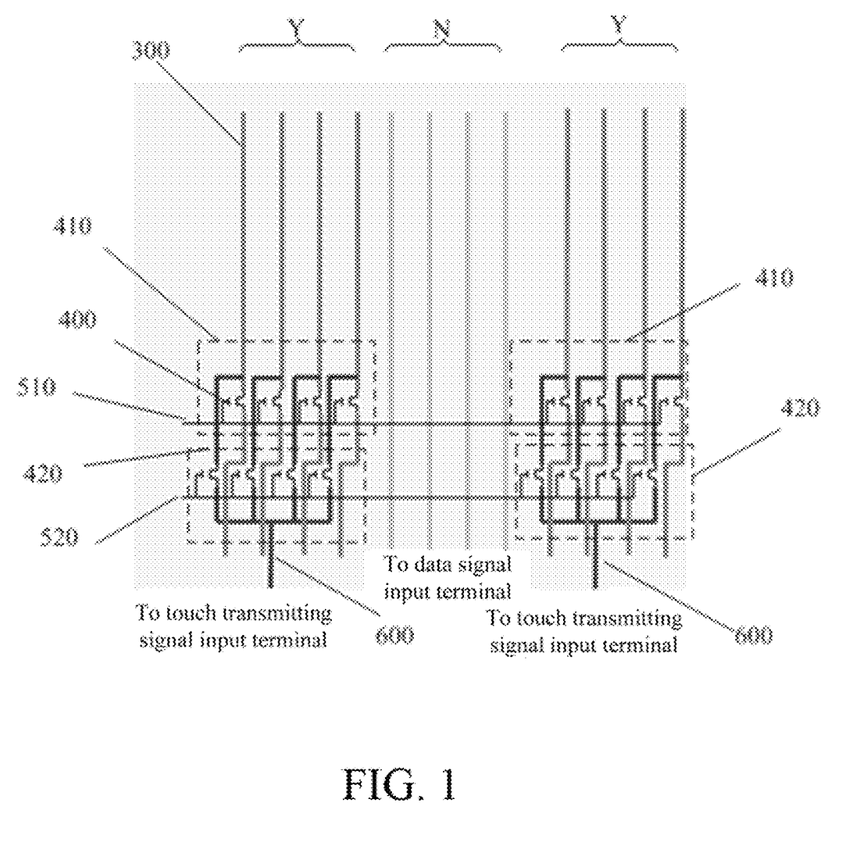
FIG. 1 is a schematic diagram of partial structure of an array substrate provided in accordance with an example embodiment.

With reference to FIG. 1, respective data lines 300 in the array substrate are divided into reused data line sets Y and non-reused data line sets N, each reused data line set Y and each non-reused data line set N includes four data lines 300. In addition, a display switch array 410 and a touch switch array 420, a touch transmitting electrode line 600, a display control signal line 510 for controlling the display switch array 410, and a touch control signal line 520 for controlling the touch switch array 420 are also formed on the array substrate.

Wherein, control terminals of the display switches 400 in each display switch array 410 are all coupled to the display control signal line 510, and control terminals of the touch switches 400 in each touch switch array 420 are all coupled to the touch control signal line 520; moreover, one display switch array 410 and one touch switch array 420 are correspondingly coupled to one reused data line set Y, and one touch transmitting electrode line 600 is coupled to one touch switch array 420. Specifically, respective display switches 400 in one display switch array 410 correspond to respective data lines 300 in a corresponding reused data line set Y in one to one correspondence, a first terminal (upper terminal) of each display switch 400 is coupled to a corresponding data line 300, and a second terminal (lower terminal) of each display switch 400 is coupled to a corresponding data signal input terminal; respective touch switches 400 in one touch switch array 420 also correspond to data lines 300 in a corresponding reused data line set Y in one to one correspondence, a first terminal (upper terminal) of each touch switch 400 is coupled to a corresponding data line 300, and a second terminal (lower terminal) of each touch switch 400 is coupled to a same touch transmitting electrode line 600, and each touch transmitting electrode line 600 is coupled to a corresponding touch transmitting signal input terminal.

Figure 2:
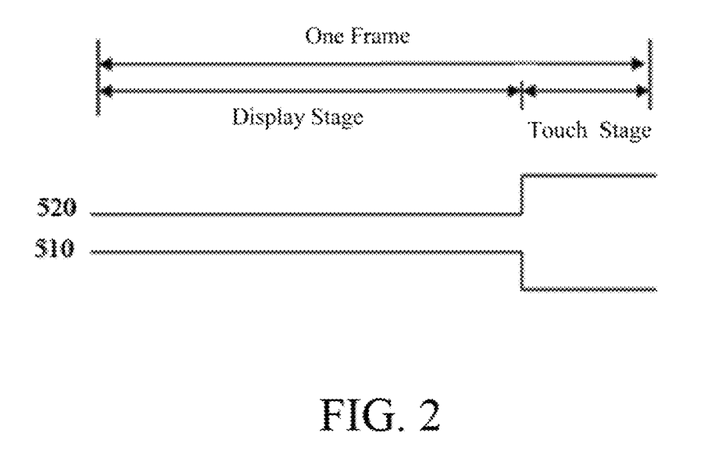
FIG. 2 is a sequential diagram of a driving method for the array substrate shown in FIG. 1.

Assuming that the switches 400 in FIG. 1 are turned on when being at high level and are turned off when being at low level, then with reference FIG. 2, a method for driving the above array substrate may include in a display stage within each frame, applying a high level on the display control signal line 510, so that each display switch 400 in each display switch array 410 is turned on, and applying a low level on the touch control signal line 520, so that each touch switch 400 in each touch switch array 420 is turned off, and in a touch stage within each frame, applying a low level on the display control signal line 510 so that each display switch 400 in each display switch array 410 is turned off, and applying a high level on the touch control signal line 520 so that each touch switch 400 in each touch switch array 420 is turned on.

As such, in the display stage, respective data lines 300 are connected to corresponding data signal input terminals and thus are used to transfer data signals, while in the touch stage, respective data lines 300 are connected to corresponding touch transmitting signal input terminals, and thus are used as touch transmitting electrodes to realize touch detection.

From above it can be seen that, in the array substrate provided in accordance with the example embodiment, data lines can be reused, thereby realizing touch detection. Since data lines generally also need to be formed from metal material, they can be formed in a same process as for forming touch transmitting electrode lines, thus manufacturing difficulty can be reduced.

In FIG. 1, data lines 300 are divided into reused data line sets Y and non-reused data line sets N, and only data lines 300 in the reused data line sets Y are reused as touch transmitting electrodes, thus number of switches 400 and number of touch transmitting electrode lines 600 can be reduced, and difficulty in manufacturing process can be further reduced. When it is ensured that number (e.g. 4) of data lines in the reused data line set Y and in the non-reused data line set N is not too large, requirement on touch accuracy generally can be satisfied. It is readily appreciated that, on premise of not departing from the spirit and scope of the disclosure, it may also be the case that one touch switch and one display switch are provided for each data line 300, and all of the data lines 300 (including the data lines 300 in both the reused data line set Y and non-reused data line set N) are reused as transmitting electrodes. In addition, on premise of satisfying requirement on touch accuracy, the number of data lines 300 coupled to a same touch transmitting electrode line 600 as one touch transmitting electrode is not necessarily 4.

In FIG. 1, the display switch array 410 and the touch switch array 420 are such display/touch conversion switch array that collectively enables the data lines 300 to be used as data lines for providing data voltage or enable the data lines 300 to be reused as touch transmitting electrodes. However, it is readily appreciated that the above display/touch conversion switch array may also take other forms.

Figure 3:
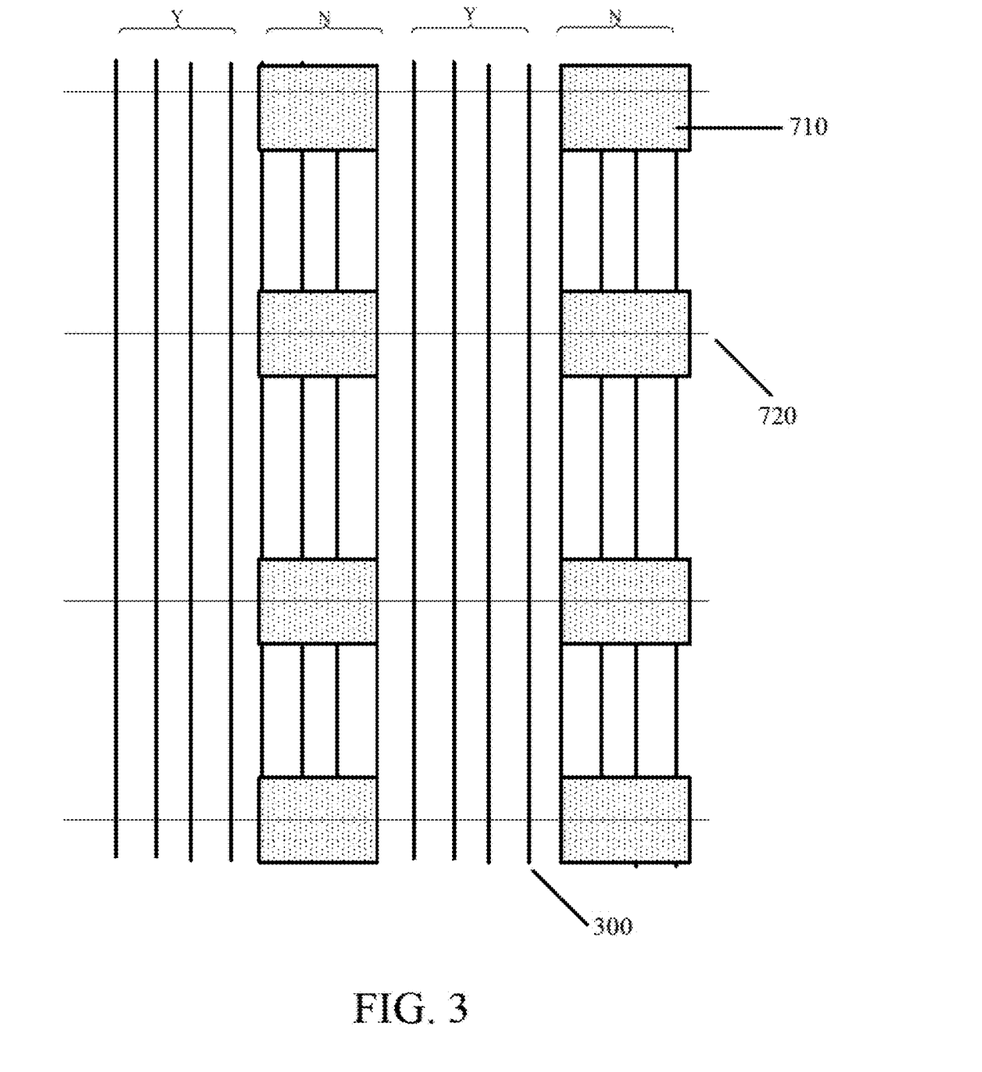
FIG. 3 is a schematic diagram of partial structure of a display apparatus including the array substrate shown in FIG. 1.

As shown in FIG. 3, in addition to the data lines formed on the array substrate shown in FIG. 1, the display apparatus provided in accordance with the example embodiment further includes a color film substrate, the color film substrate includes a substrate (not shown) and a common electrode pattern formed on the substrate that consists of a plurality of common electrode blocks 710, as well as touch receiving electrode lines 720 coupled to respective common electrode blocks 710 in each row. Respective common electrode blocks 710 in each row are coupled to one touch receiving electrode line 720, thus may be reused as one touch receiving electrode 720. As such, since touch receiving electrodes need not to be manufactured separately, cell gap of the display apparatus can be reduced and manufacturing process is simplified.

Of course, in practical application, the above color film substrate may also include structure such as a color filter layer, a black matrix, and so on, which will not be further described herein.

In some example embodiments, in addition to the above array substrate and the color film substrate, the display apparatus may further include a data driving circuit, a touch driving circuit, a gate scanning circuit and a sequential control circuit, wherein the data driving circuit is coupled to a display enable signal output terminal of the sequential control circuit and to a data signal input terminal of the array substrate, and adapted to output a data voltage to the array substrate when receiving a display enable signal outputted by the sequential control circuit through the display enable signal output terminal. The gate scanning circuit is coupled to the display enable signal output terminal of the sequential control circuit, and adapted to turn on pixel switches in the pixel switch array row by row when receiving the display enable signal outputted by the sequential control circuit through the display enable signal output terminal, the touch driving circuit is coupled to a touch enable signal output terminal of the sequential control circuit and to a touch transmitting signal input terminal of the array substrate, and adapted to output a touch transmitting signal to the array substrate when receiving a touch enable signal outputted by the sequential control circuit through the touch enable signal output terminal, and the display control signal line is coupled to the display enable signal output terminal, the display switch is adapted to be turned on when the display enable signal is outputted at the display enable signal output terminal; the touch control signal line is coupled to the touch enable signal output terminal, the touch switch is adapted to be turned on when the touch enable signal is outputted at the touch enable signal output terminal.

This is equivalent to that the display enable signal output terminal and the touch enable signal output terminal of a sequential controller are reused, thus controlling of the display switches and the touch switches is realized without redesigning the sequential controller.

In some example embodiments, the display apparatus may be a mobile phone, a television, a desktop computer, a PAD, a palm computer, or any other devices having display function.

According to an example embodiment, there is provided a method for manufacturing an array substrate, the method can be used to manufacture the above array substrate, and includes forming a pixel switch array, gate scanning lines and data lines on a substrate, and forming data signal input terminals and touch transmitting signal input terminals. The method further includes forming a display/touch conversion switch array and a conversion control signal line on the substrate, wherein the display/touch conversion switch array is coupled to a plurality of data lines of the data lines and to the conversion control signal line, and is adapted to, under the control of the conversion control signal line, couple the plurality of data lines to the data signal input terminals in a display stage and couple the plurality of data lines to the touch transmitting signal input terminals in a touch stage as touch transmitting electrodes.

In the array substrate manufactured by the manufacturing method provided in accordance with the example embodiment, data lines are reused as touch transmitting electrodes to realize touch detection, since data lines are generally extended through the entire display area along a column direction, it is not necessary to form touch transmitting electrode lines separately, whereby manufacturing difficulty is reduced. Alternatively, even touch transmitting electrode lines having certain length need to be manufactured due to limitation on the number of touch transmitting signal input terminals, since the data lines are also generally formed from metal material, the data lines can be formed in a same process as for forming the touch transmitting electrode lines, thus manufacturing difficulty can also be reduced.

For detailed process for forming the pixel switch array, the gate scanning lines, the data lines, and for forming the data signal input terminals and the touch transmitting signal input terminals, as well as the display/touch conversion switch array and the conversion control signal line, reference may be made to the prior art which will not be further described herein.

According to an example embodiment, the display/touch conversion switch array can be formed in a same process as for forming the pixel switch array, whereby complexity of the manufacturing process can be reduced.

The foregoing is merely example embodiments of the disclosure, however, protection scope of the disclosure is not limited thereto. Within the technical scope disclosed, variations or substitutions readily occurring to a person skilled in the art should be covered by the protection scope of the disclosure. Therefore, protection scope of the disclosure should be defined by the accompanying claims.

What is claimed is:

1. An array substrate comprising:
   a substrate;
   a pixel switch array; and
   a plurality of gate scanning lines and a plurality of data lines formed on the substrate, and having data signal input terminals and touch transmitting signal input terminals, the array substrate further comprising a display/touch conversion switch array and a conversion control signal line formed on the substrate, wherein the display/touch conversion switch array is coupled to at least a part of the data lines and to the conversion control signal line, and is adapted to, under control of the conversion control signal line, couple the at least a part of the data lines to the data signal input terminals in a display stage, and couple the at least a part of the data lines to the touch transmitting signal input terminals in a touch stage as touch transmitting electrodes.

2. The array substrate according to claim 1, wherein the display/touch conversion switch array comprises a display switch array and a touch switch array, and wherein the control signal line comprises a display control signal line and a touch control signal line, wherein:
   each display switch of the display switch array has a first terminal coupled to one data line in one to one correspondence, has a second terminal coupled to one data signal input terminal in one to one correspondence, and has a control terminal coupled to the display control signal line; and
   each touch switch of the touch switch array has a first terminal coupled to one data line in one to one correspondence, has a second terminal coupled to the touch transmitting signal input terminal, and has a control terminal coupled to the touch control signal line.

3. The array substrate according to claim 2, wherein each of the touch transmitting signal input terminals is coupled to the second terminals of the touch switches coupled to at least two adjacent data lines.

4. The array substrate according to claim 3, wherein each of the touch transmitting signal input terminals is coupled to the second terminals of the touch switches coupled to four adjacent data lines.

5. The array substrate according to claim 1, wherein the plurality of data lines are grouped into at least one first set of data lines and at least one second set of data lines, wherein the at least one first set and the at least one second set are arranged alternately, and wherein the display/touch conversion switch array is coupled to the data lines in one of the at least one first set and the at least one second set.

6. A driving method for driving the array substrate according to claim 1, comprising:
   in the display stage, applying a control signal on the conversion control signal line so that the display/touch conversion switch array couples the plurality of data lines to the data signal input terminals; and
   in the touch stage, applying a control signal on the conversion control signal line so that the display/touch conversion switch array couples the plurality of data lines to the touch transmitting signal input terminals.

7. The driving method according to claim 6, further comprising in the touch stage, applying a control signal on the gate scanning lines so that pixel switches in the pixel switch array are turned off.

8. A method for manufacturing an array substrate, the method comprising:
   forming a pixel switch array, gate scanning lines, and data lines on a substrate;
   forming data signal input terminals and touch transmitting signal input terminals; and
   forming a display/touch conversion switch array and a conversion control signal line on the substrate, wherein the display/touch conversion switch array is coupled to a at least a part of the data lines and to the conversion control signal line, and is adapted to, under the control of the conversion control signal line, couple the at least a part of the data lines to the data signal input terminals in a display stage and couple the at least a part of the data lines to the touch transmitting signal input terminals in a touch stage as touch transmitting electrodes.

9. The method according to claim 8, wherein forming the display/touch conversion switch array on the substrate comprises forming the display/touch conversion switch array using the same process used to form the pixel switch array.

10. A display apparatus comprising the array substrate according to claim 1, wherein the display apparatus further comprises a color film substrate.

11. The display apparatus according to claim 10, wherein the color film substrate comprises a substrate and a common electrode pattern formed on the substrate, wherein the common electrode pattern comprises a plurality of common electrode blocks and touch receiving electrode lines, and wherein the common electrode blocks located in a same row are coupled to a same touch electrode receiving line as one touch receiving electrode.

12. The display apparatus according to claim 11, wherein the display/touch conversion touch array in the array substrate comprises a display switch array and a touch switch array, wherein the control signal line comprises a display control signal line and a touch control signal line, and wherein the display apparatus further comprises a data driving circuit, a touch driving circuit, a gate scanning circuit, and a sequential control circuit, wherein:
   the data driving circuit is coupled to a display enable signal output terminal of the sequential control circuit and to a data signal input terminal of the array substrate, and adapted to output a data voltage to the array substrate when receiving a display enable signal outputted by the sequential control circuit through the display enable signal output terminal;
   the gate scanning circuit is coupled to the display enable signal output terminal of the sequential control circuit, and adapted to turn on pixel switches in the pixel switch array row by row when receiving the display enable signal outputted by the sequential control circuit through the display enable signal output terminal;
   the touch driving circuit is coupled to a touch enable signal output terminal of the sequential control circuit and to a touch transmitting signal input terminal of the array substrate, and adapted to output a touch transmitting signal to the array substrate when receiving a touch enable signal outputted by the sequential control circuit through the touch enable signal output terminal;
   the display control signal line is coupled to the display enable signal output terminal, and the display switch is adapted to be turned on when the display enable signal is outputted at the display enable signal output terminal; and
   the touch control signal line is coupled to the touch enable signal output terminal, and the touch switch is adapted to be turned on when the touch enable signal is outputted at the touch enable signal output terminal.

13. The array substrate according to claim 2, wherein the plurality of data lines are grouped into at least one first set of data lines and at least one second set of data lines, wherein the at least one first set and the at least one second set are arranged alternately, and wherein the display/touch conversion switch array is coupled to one of the at least one first set and the at least one second set.

14. The array substrate according to claim 3, wherein the plurality of data lines are grouped into at least one first set of data lines and at least one second set of data lines, wherein the at least one first set and the at least one second set are arranged alternately, and wherein the display/touch conversion switch array is coupled to one of the at least one first set and the at least one second set.

15. The array substrate according to claim 4, wherein the plurality of data lines are grouped into at least one first set of data lines and at least one second set of data lines, wherein the at least one first set and the at least one second set are arranged alternately, and wherein the display/touch conversion switch array is coupled to one of the at least one first set and the at least one second set.

16. The display apparatus according to claim 10, wherein the display/touch conversion switch array comprises a display switch array and a touch switch array, wherein the control signal line comprises a display control signal line and a touch control signal line, wherein each display switch of the display switch array has a first terminal coupled to one data line in one to one correspondence, has a second terminal coupled to one data signal input terminal in one to one correspondence, and has a control terminal coupled to the display control signal line, and wherein each touch switch of the touch switch array has a first terminal coupled to one data line in one to one correspondence, has a second terminal coupled to the touch transmitting signal input terminal, and has a control terminal coupled to the touch control signal line.

17. The display apparatus according to claim 16, wherein each of the touch transmitting signal input terminals is coupled to the second terminals of the touch switches coupled to at least two adjacent data lines.

18. The display apparatus according to claim 16, wherein each of the touch transmitting signal input terminals is coupled to the second terminals of the touch switches coupled to four adjacent data lines.

19. The display apparatus according to claim 10, wherein the plurality of data lines are grouped into at least one first set of data lines and at least one second set of data lines, wherein the at least one first set and the at least one second set are arranged alternately, and wherein the display/touch conversion switch array is coupled to one of the at least one first set and the at least one second set.

\* \* \* \* \*